United States Patent [19]
Laurin et al.

[11] Patent Number: 5,849,843
[45] Date of Patent: Dec. 15, 1998

[54] POLYMERIC COMPOSITIONS FOR MEDICAL PACKAGING AND DEVICES

[75] Inventors: Dean Laurin, Round Lake Beach; Angeles Lillian Buan, Crystal Lake; Lecon Woo, Libertyville; Michael T. K. Ling; Yuan Pang Samuel Ding, both of Vernon Hills; William Anderson, Hoffman Estates; Larry A. Rosenbaum, Gurnee; Denise S. Hayward, Mundelein; Joseph P. Hoppesch, McHenry, all of Ill.; Gregg Nebgen, Burlington, Wis.; Stanley Westphal, East Dundee, Ill.

[73] Assignee: Baxter International Inc., Deerfield, Ill.

[21] Appl. No.: 153,823

[22] Filed: Nov. 16, 1993

[51] Int. Cl.$^6$ .................................................. C08L 77/00
[52] U.S. Cl. .............................. 525/66; 525/64; 525/78; 525/60; 525/84; 525/92 B; 525/92 C; 525/92 F; 525/92 J
[58] Field of Search .............................................. 525/66

[56] References Cited

U.S. PATENT DOCUMENTS

| | | | |
|---|---|---|---|
| 2,705,223 | 3/1955 | Renfrew et al. | 260/18 |
| 3,255,923 | 6/1966 | Soto | 222/80 |
| 3,375,300 | 3/1968 | Ropp | 260/857 |
| 3,772,136 | 11/1973 | Workman | 161/169 |
| 3,912,843 | 10/1975 | Brazier | 428/474 |
| 3,937,758 | 2/1976 | Castagna | 260/876 |
| 3,995,084 | 11/1976 | Berger et al. | 428/35 |
| 4,041,103 | 8/1977 | Davidson et al. | 260/857 |
| 4,058,647 | 11/1977 | Inoue et al. | 428/474 |
| 4,087,587 | 5/1978 | Shida et al. | 428/500 |
| 4,087,588 | 5/1978 | Shida et al. | 428/500 |
| 4,095,012 | 6/1978 | Schirmer | 428/474 |
| 4,110,303 | 8/1978 | Gergen et al. | 525/92 B |
| 4,147,827 | 4/1979 | Breidt, Jr. et al. | 428/218 |
| 4,230,830 | 10/1980 | Tanny et al. | 525/222 |
| 4,233,367 | 11/1980 | Ticknor | 428/476.3 |
| 4,311,807 | 1/1982 | McCullough et al. | 525/197 |
| 4,322,465 | 3/1982 | Webster | 428/194 |
| 4,322,480 | 3/1982 | Tuller et al. | 428/476.1 |
| 4,327,726 | 5/1982 | Kwong | 128/272 |
| 4,332,655 | 6/1982 | Berejka | 204/159.2 |
| 4,387,184 | 6/1983 | Coquard | 525/183 |
| 4,405,667 | 9/1983 | Christensen et al. | 428/35 |
| 4,407,877 | 10/1983 | Rasmussen | 428/105 |
| 4,407,888 | 10/1983 | Crofts | 428/355 |
| 4,417,753 | 11/1983 | Bacebowski et al. | 285/21 |
| 4,429,076 | 1/1984 | Saito et al. | 525/57 |
| 4,479,989 | 10/1984 | Mahal | 428/35 |
| 4,521,437 | 6/1985 | Storms | 426/130 |
| 4,548,348 | 10/1985 | Clements | 229/1.5 H |
| 4,562,118 | 12/1985 | Maruhasi et al. | 428/412 |
| 4,568,723 | 2/1986 | Lu | 525/92 |
| 4,588,648 | 5/1986 | Krueger et al. | 428/475.8 |
| 4,599,276 | 7/1986 | Martini | 428/105 |
| 4,627,844 | 12/1986 | Schmitt | 604/264 |
| 4,636,412 | 1/1987 | Field | 428/35 |
| 4,640,870 | 2/1987 | Akazawa et al. | 428/483 |
| 4,643,926 | 2/1987 | Mueller | 428/35 |
| 4,686,125 | 8/1987 | Johnston et al. | 428/424.6 |
| 4,692,361 | 9/1987 | Johnston et al. | 428/35 |
| 4,707,389 | 11/1987 | Ward | 428/36 |
| 4,724,028 | 2/1988 | Zabielski et al. | 156/256 |
| 4,726,997 | 2/1988 | Mueller et al. | 428/480 |
| 4,732,795 | 3/1988 | Ohya et al. | 428/36 |
| 4,734,327 | 3/1988 | Vicik | 428/332 |
| 4,735,855 | 4/1988 | Wofford et al. | 428/349 |
| 4,740,582 | 4/1988 | Coquard et al. | 528/339.3 |
| 4,753,222 | 6/1988 | Morishita | 128/4 |
| 4,760,114 | 7/1988 | Haff | 525/66 |
| 4,764,404 | 8/1988 | Genske et al. | 428/35 |
| 4,767,651 | 8/1988 | Starczewski et al. | 428/35 |
| 4,772,497 | 9/1988 | Maasola | 428/35 |
| 4,778,697 | 10/1988 | Genske et al. | 428/35 |
| 4,792,488 | 12/1988 | Schirmer | 428/349 |
| 4,795,782 | 1/1989 | Lutz et al. | 525/66 |
| 4,800,129 | 1/1989 | Deak | 428/474.4 |
| 4,803,102 | 2/1989 | Raniere et al. | 428/35.2 |
| 4,834,755 | 5/1989 | Silvestrini et al. | 623/13 |
| 4,855,356 | 8/1989 | Holub et al. | 525/66 |
| 4,856,259 | 8/1989 | Woo et al. | 53/373 |
| 4,856,260 | 8/1989 | Woo et al. | 53/373 |
| 4,863,996 | 9/1989 | Nakazima et al. | 525/92 |
| 4,871,799 | 10/1989 | Kobayashi et al. | 525/64 |
| 4,873,287 | 10/1989 | Holub et al. | 525/92 |

(List continued on next page.)

FOREIGN PATENT DOCUMENTS

| | | |
|---|---|---|
| 92897 | 2/1983 | European Pat. Off. . |
| 2688511 | 9/1993 | France . |
| 2 177 974 | 2/1987 | United Kingdom . |
| WO83/00158 | 1/1983 | WIPO . |
| WO86/07010 | 12/1986 | WIPO . |
| WO 93 23093 | 11/1993 | WIPO . |

Primary Examiner—Ana Woodward
Attorney, Agent, or Firm—Mark J. Buonaiuto; Joseph A. Fuchs

[57] ABSTRACT

Multiple component polymer compositions for fabrication into articles. In particular, polymeric compositions comprising a heat resistant polymer; a radio frequency ("RF") susceptible polymer; a compatibilizing polymer; the composition having physical properties within the range a<40,000 psi; b>=70%; c<30%; d>1.0; e<0.1%; f<0.1%; g>=0.05; h<=60%; i=0; wherein: a is the mechanical modulus of the composition measured according to ASTM D-882; b is the percent recovery in length of the composition after an initial 20% deformation; c is the optical haze of the composition being 9 mils in thickness according to ASTM D-1003; d is the loss tangent of the composition at 1 Hz measured at melt processing temperatures; e is the elemental halogen content by weight of the composition; f is the low molecular weight water soluble fraction of the composition; g is the dielectric loss between 1 and 60 MHz and over temperatures of 25° to 250° C. of the composition; h sample creep measured at 121° C. for a 1 inch strip of the composition under 27 psi loading; and, i indicates the composition exhibits no strain whitening after being strained at moderate speeds of about 20 inches (50 cm) per minute to about 100% elongation (twice the original length) and the presence of strain whitening (indicated by 1) or lack thereof (indicated by 0) is noted.

18 Claims, No Drawings

U.S. PATENT DOCUMENTS

| Patent # | Date | Inventor | Class |
|---|---|---|---|
| 4,877,682 | 10/1989 | Sauers et al. | 428/412 |
| 4,885,119 | 12/1989 | Mueller et al. | 264/22 |
| 4,910,085 | 3/1990 | Raniere et al. | 428/412 |
| 4,915,893 | 4/1990 | Gogolewski et al. | 264/205 |
| 4,923,470 | 5/1990 | Dumican | 623/11 |
| 4,929,479 | 5/1990 | Shishido | 428/35.2 |
| 4,957,966 | 9/1990 | Nishio et al. | 525/66 |
| 4,957,967 | 9/1990 | Mizuno et al. | 525/68 |
| 4,966,795 | 10/1990 | Genske et al. | 428/34.3 |
| 4,977,213 | 12/1990 | Giroud-Abel et al. | 525/66 |
| 4,996,054 | 2/1991 | Pietsch et al. | 424/422 |
| 5,006,601 | 4/1991 | Lutz et al. | 525/66 |
| 5,017,652 | 5/1991 | Abe et al. | 525/68 |
| 5,034,457 | 7/1991 | Serini et al. | 525/67 |
| 5,034,458 | 7/1991 | Serini et al. | 525/67 |
| 5,053,457 | 10/1991 | Lee | 525/78 |
| 5,071,686 | 12/1991 | Genske et al. | 428/35.7 |
| 5,071,911 | 12/1991 | Furuta et al. | 525/68 |
| 5,071,912 | 12/1991 | Furuta et al. | 525/68 |
| 5,075,376 | 12/1991 | Furuta et al. | 525/68 |
| 5,079,295 | 1/1992 | Furuta et al. | 525/68 |
| 5,085,649 | 2/1992 | Flynn | 604/282 |
| 5,093,164 | 3/1992 | Bauer et al. | 428/35.4 |
| 5,093,194 | 3/1992 | Touhsaent et al. | 428/349 |
| 5,094,921 | 3/1992 | Itamura et al. | 428/520 |
| 5,108,844 | 4/1992 | Blemberg et al. | 428/518 |
| 5,110,642 | 5/1992 | Genske | 428/35.8 |
| 5,116,906 | 5/1992 | Mizuno et al. | 525/68 |
| 5,129,894 | 7/1992 | Sommermeyer et al. | 604/408 |
| 5,132,363 | 7/1992 | Furuta et al. | 525/68 |
| 5,145,731 | 9/1992 | Lund et al. | 482/35.4 |
| 5,154,979 | 10/1992 | Kerschbaumer et al. | 428/476.9 |
| 5,159,004 | 10/1992 | Furuta et al. | 524/390 |
| 5,164,267 | 11/1992 | D'Heur et al. | 428/474 |
| 5,176,634 | 1/1993 | Smith et al. | 604/87 |
| 5,176,956 | 1/1993 | Jevne et al. | 128/640 |
| 5,183,706 | 2/1993 | Bekele | 428/349 |
| 5,185,189 | 2/1993 | Stenger et al. | 428/34.8 |
| 5,189,091 | 2/1993 | Laughner | 524/445 |
| 5,194,316 | 3/1993 | Horner et al. | 428/195 |
| 5,196,254 | 3/1993 | Akiyama | 428/178 |
| 5,206,290 | 4/1993 | Mizuno et al. | 525/134 |
| 5,212,238 | 5/1993 | Schelbelhoffer et al. | 525/66 |
| 5,218,048 | 6/1993 | Abe et al. | 525/92 |
| 5,230,934 | 7/1993 | Sakano et al. | 428/35.7 |
| 5,230,935 | 7/1993 | Delimoy et al. | 428/36.7 |
| 5,238,997 | 8/1993 | Bauer et al. | 525/66 |
| 5,244,971 | 9/1993 | Dekoninck | 525/64 |
| 5,258,230 | 11/1993 | LaFleur | 428/412 |
| 5,278,231 | 1/1994 | Chundry | 525/66 |
| 5,288,799 | 2/1994 | Schmid et al. | 525/6 |
| 5,290,856 | 3/1994 | Okamoto et al. | 525/64 |
| 5,306,542 | 4/1994 | Bayer | 428/192 |
| 5,312,867 | 5/1994 | Mitsuno | 525/66 |
| 5,317,059 | 5/1994 | Chundury et al. | 525/66 |
| 5,342,886 | 8/1994 | Glotin et al. | 525/66 |
| 5,348,794 | 9/1994 | Takahashi et al. | 428/213 |
| 5,356,676 | 10/1994 | von Widdern et al. | 428/34.8 |
| 5,371,141 | 12/1994 | Gelles et al. | 525/66 |
| 5,378,543 | 1/1995 | Murata et al. | 428/517 |
| 5,378,800 | 1/1995 | Mok et al. | 528/349 |
| 5,387,645 | 2/1995 | Montag et al. | 525/66 |

POLYMERIC COMPOSITIONS FOR MEDICAL PACKAGING AND DEVICES

DESCRIPTION

1. Technical Field

The present invention relates generally to thermoplastic polymer alloys for fabricating into films, containers, tubing, and other devices.

2. Background Prior Art

In the medical field, where beneficial agents are collected, processed and stored in containers, transported, and ultimately delivered through tubes by infusion to patients to achieve therapeutic effects, materials which are used to fabricate the containers and tubes must have a unique combination of properties. For example, in order to visually inspect solutions for particulate contaminants, the container or tubing must be optically transparent. To infuse a solution from a container by collapsing the container walls, without introducing air into the container, the material which forms the walls must be sufficiently flexible. The material must be functional over a wide range of temperatures. The material must function at low temperatures by maintaining its flexibility and toughness because some solutions, for example, certain premixed drug solutions are stored and transported in containers at temperatures such as −25° to −30° C. to minimize the drug degradation. The material must also be functional at high temperatures to withstand the heat of sterilization; a process which most medical packages and nutritional products are subjected to prior to shipment. The sterilization process usually includes exposing the container to steam at temperatures typically 121° C. and at elevated pressures. Thus, the material needs to withstand the temperature and pressures without significant distortions ("heat distortion resistance").

For ease of manufacture into useful articles, it is desirable that the material be sealable using radio frequency ("RF") generally at about 27.12 MHz. Therefore, the material should possess sufficient dielectric loss properties to convert the RF energy to thermal energy.

A further requirement is to minimize the environmental impact upon the disposal of the article fabricated from the material after its intended use. For those articles that are disposed of in landfills, it is desirable to use as little material as possible and avoid the incorporation of low molecular weight leachable components to construct the article. Thus, the material should be light weight and have good mechanical strength. Further benefits are realized by using a material which may be recycled by thermoplastically reprocessing the post-consumer article into other useful articles.

For those containers which are disposed of through incineration, it is necessary to use a material which helps to eliminate the dangers of biological hazards, and to minimize or eliminate entirely the formation of inorganic acids which are environmentally harmful, irritating, and corrosive, or other products which are harmful, irritating, or otherwise objectionable upon incineration.

It is also desirable that the material be free from or have a low content of low molecular weight additives such as plasticizers, stabilizers and the like which could be released into the medications or biological fluids or tissues thereby causing danger to patients using such devices or are contaminating such substances being stored or processed in such devices. For containers which hold solutions for transfusion, such contamination could make its way into the transfusion pathway and into the patient causing injury or death to the patient.

Traditional flexible polyvinyl chloride materials meets a number of, and in some cases, most of the above-mentioned requirements. Polyvinyl chloride ("PVC") also offers the distinct advantage of being one of the most cost effective materials for constructing devices which meet the above requirements. However, PVC may generate objectionable amounts of hydrogen chloride (or hydrochloric acid when contacted with water) upon incineration, causing corrosion of the incinerator. PVC sometimes contains plasticizers which may leach into drugs or biological fluids or tissues that come in contact with PVC formulations. Thus, many materials have been devised to replace PVC. However, most alternate materials are too expensive to implement and still do not meet all of the above requirements.

There have been many attempts to develop a film material to replace PVC, but most attempts have been unsuccessful for one reason or another. For example, in U.S. Pat. No. 4,966,795 which discloses multi-layer film compositions capable of withstanding the steam sterilization, cannot be welded by radio frequency dielectric heating thus cannot be assembled by this rapid, low costs, reliable and practical process. European Application No. EP 0 310 143 A1 discloses multilayer films that meet most of the requirements, and can be RF welded. However, components of the disclosed film are cross-linked by radiation and, therefore, cannot be recycled by the standard thermoplastic processing methods. In addition, due to the irradiation step, appreciable amounts of acetic acid is liberated and trapped in the material. Upon steam sterilization, the acetic acid migrates into the packaging contents as a contaminant and by altering the pH of the contents acts as a potential chemical reactant to the contents or as a catalyst to the degradation of the contents.

The main objective of the present invention is the creation of thermoplastic materials which are, overall, superior to those materials, of which we are aware, which have been heretofore known to the art or have been commercially used or marketed. The properties of such materials includes flexibility, extensibility, and strain recoverability, not just at room temperatures, but through a wide range of ambient and refrigerated temperatures. The material should be sufficiently optically transparent for visual inspection, and steam sterilizable at temperatures up to 121° C. The material should be capable of being subjected to significant strains without exhibiting strain whitening, which can indicate a physical and a cosmetic defect. A further objective is that the material be capable of assembly by the RF methods. Another objective is that the material be without low molecular weight leachable additives, and be capable of safe disposal by incineration without the generation of significant amounts of corrosive inorganic acids. Another objective is that the material be recyclable by standard thermoplastic processing methods after use. It is also desirable that the material incorporate reground scrap material recovered during the manufacturing process to save material costs. Finally, the material should serve as a cost effective alternative to various PVC formulations currently being used for medical devices.

When more than one polymer is blended to form an alloying composition, it is difficult to achieve all of the above objectives simultaneously. For example, in most instances alloy composition scatter light; thus, they fail to meet the optical clarity objective. The light scattering intensity (measured by haze) depends on the domain size of components in the micrometer ($\mu$) range, and the proximity of the refractive indices of the components. As a general rule, the selection of components that can be satisfactorily processed into very small domain sizes, and yet with a minimum of refractive index mismatches, is a difficult task.

The present invention is provided to solve these and other problems.

SUMMARY OF THE INVENTION

In accordance with the present invention certain thermoplastic polymer compositions have been developed which are substantial improvements to compositions and articles of which we are aware. These compositions may be fabricated into medical grade articles such as bags for storing medical solutions or tubings for conveying medical fluids or may be used to make other products or components of finished products such as connectors, adaptors, manifolds, valves, conduits, catheters, and etc.

It is an object of the present invention to prepare a composition having the following physical properties: (1) a mechanical modulus less than 40,000 psi and more preferably less than 25,000 when measured in accordance with ASTM D-882, (2) a greater than or equal to 70%, and more preferably greater than or equal to 75%, recovery in length after an initial deformation of 20%, (3) and optical haze of less than 30%, and more preferably less than 15%, when measured for a composition 9 mils thick and in accordance to ASTM D-1003, (4) the loss tangent measured at 1 Hz at processing temperatures is greater than 1.0, and more preferably greater than 2.0, (5) the content of elemental halogens is less than 0.1%, and more preferably less than 0.01%, (6) the low molecular weight water soluble fraction is less than 0.1%, and more preferably less than 0.005%, (7) the maximum dielectric loss between 1 and 60 MHz and between the temperature range of 25°–250° C. is greater than or equal to 0.05 and more preferably greater than or equal to 0.1, (8) autoclave resistance measured by sample creep at 121° C. under 27 psi loading is less than or equal to 60% and more preferably less than or equal to 20%, and (9) there is no strain whitening after being strained at moderate speeds of about 20 inches (50 cm) per minute at about 100% elongation and the presence of strain whitening is noted or the lack thereof.

The polymer based compositions of the present invention that satisfy these physical properties comprise multiple component compositions. Three component compositions consists of a first component of a flexible polyolefin that confers heat resistance and flexibility, a second component of a RF susceptible polymer that renders the film RF sealable, and a third component that confers compatibility between the first two components. The RF susceptible polymers of the present invention, which will be set forth in detail below, should have a dielectric loss of greater than 0.05 at frequencies within the range of 1–60 MHz within a temperature range of ambient to 250° C. The first component should constitute within a range of 40–90% by weight of the composition, the second component should constitute within the range of 5–50% by weight of the composition, and the third component should constitute 5–30% by weight of the composition.

In another embodiment of the three component composition, the first component confers high temperature resistance, the second component is an RF susceptible polymer that renders the composition RF sealable and confers flexibility to the film, and the third component serves as a compatabilizer between the first two components. The first component should constitute within the range of 30–60%, the second component 30–60%, and the third component 5–30% by weight of the composition.

Four component compositions include a first propylene based polyolefin, which may include isotactic and syndiotactic stereo isomers, a second non-propylene based polyolefin, a third component of a RF susceptible polymer that renders the compositions RF sealable, and a compatibilizing polymer. Preferably the first polyolefin is polypropylene which constitutes approximately 30–60% by weight of the compositions, and most preferably 45%. The second polyolefin is preferably an ultra low density polyethylene or polybutene-1 which constitute approximately 25–50% by weight of the compositions, and most preferably 45%. The RF component is preferably a dimer fatty acid polyamide (which should be interpreted to include their hydrogenated derivatives as well), which constitutes approximately 3–40% by weight of the compositions, and most preferably 10%. The fourth component is a compatibilizing polymer that may be selected from various block copolymers of styrene with dienes or alpha olefins; the compatibilizing polymers may be modified with minor amounts of chemically active functionalities. For example, the compatibilizing polymer may be a styrene ethylene-butene styrene ("SEBS") block copolymers. The fourth component should constitute between 5–40% by weight of the composition and most preferably 10%.

These three and four component compositions each may be compounded and extruded to form a thin film which is RF active so that it is RF sealable to itself. For example, films and tubings may be used to produce sterile fluid packages, containers for blood and blood components, intravenous and medical solutions, nutritional and respiratory therapy products, as well as dialysis solutions. The compositions may also be used to construct port tubes and access devices for containers. The compositions may also be used to form other products through injection molding, blow molding, thermoforming, or other known thermoplastically processing methods.

The compositions are compatible with medical applications because the components which constitute the film have a minimal extractability to the fluids and contents that the composition come in contact with. Further, the films are environmentally sound in that they do not generate harmful degradants upon incineration. Finally, the films provide a cost effective alternative to PVC.

Additional features and advantages of the present invention are described in, and will be apparent from the detailed description of the presently preferred embodiments.

DETAILED DESCRIPTION

While this invention is susceptible of embodiments in many different forms, and will herein be described in detail, preferred embodiments of the invention are disclosed with the understanding that the present disclosure is to be considered as exemplifications of the principles of the invention and are not intended to limit the broad aspects of the invention to the embodiments illustrated.

More particularly, according to the present invention it is desirable to provide compositions which may be thermoplastically fabricated into articles, devices, and products, which meet the requirements set forth above.

To this end, as noted above, it has been found that material having these characteristics can be prepared from compositions having preferably three, four or more components. The three and four component compositions will be discussed separately below.

Three Component Compositions

In a first embodiment of a three component system, the first component will confer heat resistance and flexibility to the composition. This component may be chosen from the group consisting of amorphous polyalpha olefins and preferably is a flexible polyolefin. These polyolefins.should resist distortions to high temperatures up to 121° C., having a peak melting point of greater than 130° C. and be highly flexible, having a modulus of not more than 20,000 psi. Such a flexible polyolefin is sold under the product designation Rexene FPO 90007 which has a peak melting point of 145° C. and a modulus of 11,000 psi. In addition, certain polypropylenes with high syndiotacticity also posses the properties of high melting point and low modulus. The first component should constitute by weight within the range of 40–90% by weight of the composition.

The second component of the three component composition is an RF susceptible polymer which confers RF sealability to the composition and may be selected from either of two groups of polar polymers. The first group consists of ethylene copolymers having 50–85% ethylene content with comonomers selected from the group consisting of acrylic acid, methacrylic acid, ester derivatives of acrylic: acid with alcohols having 1–10 carbons, ester derivatives of methacrylic acid with alcohols having 1–10 carbons, vinyl acetate, and vinyl alcohol. The RF susceptible polymer may also be selected from a second group consisting of copolymers containing segments of polyurethane, polyester, polyurea, polyimide, polysulfones, and polyamides. These functionalities may constitute between 5–100% of the RF susceptible polymer. The RF susceptible polymer should constitute by weight within the range of 5–50% of the composition. Preferably, the RF component is copolymers of ethylene methyl acrylate with methyl acrylate within the range of 15–25% by weight of the polymer.

The final component of the three component compound ensures compatibility between the first two components, and is selected from an styrenic block copolymers and preferably is maleic anhydride functionalized. The third component should constitute by weight within the range of 5–30% of the composition.

In a second embodiment of the three component film, the first component confers RF sealability and flexibility over the desired temperature range. The first component confers high temperature resistance ("temperature resistant polymer") and is chosen from the group consisting of polyamides, polyimides, polyurethanes, polypropylene and polymethylpentene. Preferably the first component constitutes by weight within the range of 30–60% of the composition, and preferably is polypropylene. The second component confers RF sealability and flexibility over the desired temperature range. The RF polymer is selected from the first and second groups identified above with the exception of ethylene vinyl alcohol. The second component should constitute by weight within the range of 30–60% of the composition.

The third component ensures compatibility between the first two components and is chosen from SEBS block copolymers and preferably is maleic anhydride functionalized. The third component should constitute within the range of 5–30% by weight of the composition.

Four Component Compositions

The first component of the four component film is to confer heat resistance. This component may be chosen from polyolefins, most preferably polypropylenes, and more specifically the propylene alpha-olefin random copolymers (PPE). Preferably, the PPE's will have a narrow molecular weight range. The PPE's possess the required rigidity and the resistance to yielding at the autoclave temperatures of about 121° C. However, by themselves, the PPE's are too rigid to meet the flexibility requirements. When combined by alloying with certain low modulus polymers, good flexibility can be achieved. Examples of acceptable PPE's include those sold under the product designations Soltex 4208, and Exxon Escorene PD9272.

These low modulus copolymers can include ethylene based copolymers such as ethylene-co-vinyl acetate ("EVA"), ethylene co-alpha olefins, or the so-called ultra low density (typically less than 0.90 Kg/L) polyethylenes ("ULDPE"). These ULDPE include those commercially available products sold under the trademarks TAFMER® (Mitsui Petrochemical Co.) under the product designation A485, Exact® (Exxon Chemical Company) under the product designations 4023–4024, and Insite® technology polymers (Dow Chemical Co.). In addition, poly butene-1 ("PB"), such as those sold by Shell Chemical Company under product designations PB-8010, PB-8310; thermoplastic elastomers based on SEBS block copolymers, (Shell Chemical Company), poly isobutene ("PIB") under the product designations Vistanex L-80, L-100, L-120, L-140 (Exxon Chemical Company), ethylene alkyl acrylate, the methyl acrylate copolymers ("EMA") such as those under the product designation EMAC 2707, and DS-1130 (Chevron), and n-butyl acrylates ("ENBA") (Quantum Chemical) were found to be acceptable copolymers. Ethylene copolymers such as the acrylic and methacrylic acid copolymers and their partially neutralized salts and ionomers, such as PRIMACOR® (Dow Chemical Company) and SURYLN® (E.I. DuPont de Nemours & Company) were also satisfactory. Typically, ethylene based copolymers have melting points of less than about 110° C. are not suited for autoclaving applications. Further, as will be shown in certain of the below counter examples (eg., Example 8G), not all the alloying pairs are optically clear to qualify for the visual inspection requirement. Furthermore, only a limited range of proportions of each component allows the simultaneous fulfillment of the flexibility and autoclavability requirements.

Preferably the first component is chosen from the group of polypropylene homo and random copolymers with alpha olefins which constitute by weight approximately 30–60%, more preferably 35–45%, and most preferably 45%, of the composition. For example, random copolymers of propylene with ethylene where the ethylene content is in an amount within the range of 0–6%, and more preferably 2–4%, of the weight of the polymer is preferred as the first component.

The second component of the four component composition confers flexibility and low temperature ductility and is a second polyolefin different than that of the first component wherein it contains no propylene repeating units ("non propylene based polyolefin"). Preferably it is ethylene copolymers including ULDPE, polybutene, butene ethylene copolymers, ethylene vinyl acetate, copolymers with vinyl acetate contents between approximately 18–50%, ethylene methyl acrylate copolymers with methyl acrylate contents being between approximately 20–40%, ethylene n-butyl acrylate copolymers with n-butyl acrylate content of between 20–40%, ethylene acrylic acid copolymers with the acrylic acid content of greater than approximately 15%. An example of these products are sold under such product designations as Tafmer A-4085 (Mitsui), EMAC DS-1130 (Chevron), Exact 4023, 4024 and 4028 (Exxon). More preferably, the second component is either ULDPE sold by Mitsui Petrochemical Company under the designation TAFMER A-4085, or polybutene-1, PB8010 and PB8310 (Shell Chemical Co.), and should constitute by weight approximately 25–50%, more preferably 35–45%, and most preferably 45%, of the composition.

To impart RF dielectric loss to the four component composition, certain known high dielectric loss ingredients ("RF susceptible polymers") are included in the composition. These polymers may be selected from the group of RF polymers in the first and second group set forth above.

Other RF active materials include PVC, vinylidine chlorides, and fluorides, copolymer of bis-phenol-A and epichlorohydrines known as PHENOXYS® (Union Carbide). However, significant contents of these chlorine and fluorine containing polymers would render the composition environmentally unsound as incineration of such a material would generate inorganic acids.

The polyamides of the RF susceptible polymer are preferably selected from aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amides containing copolymers (random, block, and graft). Polyamides such as nylons are widely used in thin film material because they offer abrasion resistance to the film. However, rarely are the nylons found in the layer which contacts medical solutions as they typically contaminate the solution by leaching out into the solution. However, it has been found by the Applicants of the present invention that the most preferred RF susceptible polymer are a variety of dimer fatty acid polyamides sold by Henkel Corporation under the product designations MACROMELT and VERSAMID, which do not lead to such contamination. The RF susceptible polymer preferably should constitute by weight approximately 5–30%, more preferably between 7–13%, and most preferably 10%, of the composition.

The fourth component of the composition confers compatibility between the polar and nonpolar components of the composition (sometimes referred to as a "compatibilizing polymer") and preferably is styrenic block copolymers with hydrocarbon soft segments. More preferably, the fourth component was chosen from SEBS block copolymers that are modified by maleic anhydride, epoxy, or carboxylate functionalities, and preferably is an SEBS block copolymer that contains maleic anhydride functional groups ("functionalized"). Such a product is sold by Shell Chemical Company under the designation KRATON RP-6509. The compatibilizing polymer should constitute by weight approximately 5–40%, more preferably 7–13%, and most preferably 10% of the composition.

It may also desirable to add a fifth component of a nonfunctionalized SEBS block copolymer such as the ones sold by Shell Chemical Company under the product designations KRATON G-1652 and G-1657. The fifth component should constitute by weight approximately 5–40%, more preferably 7–13%, and most of the composition.

For each of the compositions set forth above, it may be desirable to add, in trace amounts, other additives such as slip agents, lubricants, waxes, and antiblocks as is needed and as is well known in the art as long as the final composition meets the physical requirements set forth above.

The above multiple component compositions may be processed to make a variety of products such as a film. Such film may be made using several techniques well known in the industry. For example, the above components may be blended in the dry form in a high intensity blender such as a Welex blender and fed into an extruder. The components may also be gravimetrically fed into a high intensity mixing extruder of the twin screw design, such as a Werner Pfleiderer, and the output may be quenched in multiple strands in a water bath, pelletized, and dried for use. The pelletizing step may be avoided in a third method by feeding the output of the compounding extruder directly into a film extruder. It is also possible to build into a film extruder a high intensity mixing section so that an alloy film may be produced using a single extruder. The alloy may be converted into other articles and shapes using other thermoplastic converting machines such as injection molding or injection blow molding machines. Of course there are many other known methods of processing alloys into film, and the present invention should not be limited to producing a film by these exemplary methods.

Compositions having a various components and weight percentages set forth in the below examples were fabricated into films and tested using the following methods.

(1) AUTOCLAVABILITY:

Autoclave resistance is measured by sample creep, or the increase in the sample length, at 121° C. under 27 psi loading for one hour. The autoclave resistance must be less than or equal to 60%.

(2) LOW AND AMBIENT TEMPERATURE DUCTILITY:

(A) Low Temperature Ductility

In an instrumented impact tester fitted with a low temperature environmental chamber cooled with liquid nitrogen, film samples about 7 by 7 inches (18 cm by 18 cm) are mounted onto circular sample holders about 6 inches (15 cm) in diameter. A semi-spherical impact head with stress sensors is driven at high velocities (typically about 3 m/sec) into the preconditioned film loading it at the center. The stress-displacement curves are plotted, and the energy of impact is calculated by integration. The temperature at which the impact energy rises dramatically, and when the fractured specimen changes from brittle to ductile, high strain morphology is taken as a measure of the low temperature performance of the film ("L.Temp").

(B) Mechanical Modulus and Recovery:

The autoclaved film sample with a known geometry is mounted on a servohydraulically driven mechanical tester having cross heads to elongate the sample. At 10 inches (25 cm) per minute crosshead speed, the sample is elongated to about 20% elongation. At this point, the cross-heads travel and then reverse to travel in a direction opposite that originally used to stretch the sample. The stress strain behavior is recorded on a digital recorder. The elastic modulus ("E(Kpsi)") is taken from the initial slope on the stress-strain curve, and the recovery taken from the excess sample dimension as a percentage of sample elongation.

(3) RF PROCESSIBILITY:

Connected to a Callanan 27.12 MHz, 2 KW Radio Frequency generator, is a rectangular brass die of about 0.25 (6.3 mm) by 4 inches (10 cm) opposing to a flat brass electrode, also connected to the generator. Upon closing the die with two sheets of the candidate material in between, RF power of different amplitudes and durations are applied. When the RF cycle is over, the die is opened and the resultant seal examined by manually pulling apart the two sheets. The strength of the seal (versus the film strength) and the mode of failure (peel, tear, or cohesive failures) are used to rate the RF responsiveness of the material.

Alternatively, the candidate film is first sputter coated with gold or palladium to a thickness of 100 angstroms to render the surface conductive, cut into a circular geometry and mounted between the parallel electrodes in a dielectric capacitance measuring cell. Using a Hewlett Packard 4092 automatic RF bridge, the dielectric constant and the dielectric losses are measured at different frequencies up to 10 MHz and temperatures up to 150° C. The dielectric loss allows the calculation of heat generation under an RF field. From calculations or correlations with RF seal experiments the minimum dielectric loss for performance is obtained.

If the RF seal performance is obtained from the Callanan sealer, the following ranking scale is adopted:

| RF Power | RF Time | Seal Strength | Rating |
|---|---|---|---|
| 80% | 10 | No | 0 |
| 80% | 10 | Peelable | 1 |
| 80% | 05 | Peelable | 2 |
| 60% | 03 | Strong | 3 |
| 50% | 03 | Strong | 4 |
| 30% | 03 | Strong | 5 |

(4) OPTICAL CLARITY:

Post autoclaved film samples are first cut into about 2 by 2 inches (5 by 5 cms) squares, mounted on a Hunter Colorimeter and their internal haze measured according to ASTM D-1003. Typically, internal haze level of less than 30% is required, preferably less than 20% for these thicknesses ("Haze %").

(5) STRAIN WHITENING:

The autoclaved film is strained at moderate speeds of about 20 inches (50 cm) per minute to about 100% elongation (twice the original length) and the presence (indicated by 1) of strain whitening or lack thereof (indicated by 0) is noted ("S.Whitening").

(6) ENVIRONMENTAL COMPATIBILITY:

The environmental compatibility comprises three important properties: (a) the material is free of low molecular weight plasticizers which could leach into landfills upon disposal, (2) the material can be thermoplastically recycled into useful items upon fulfilling the primary purpose of medical delivery, and (3) when disposed of by energy reclaim by incineration, no significant inorganic acids are released to harm the environment. ("Envir."). The composition will also contain less than 0.1% halogens by weight. In order to facilitate recycling by melt processing, the resultant composition should have a loss tangent greater than 1.0 at 1 Hz measured at processing temperatures.

(7) SOLUTION COMPATIBILITY

By solution compatibility we mean that a solution contained within the film is not contaminated by components which constitute the composition. ("S.Comp.") The low molecular weight water soluble fraction of the composition will be less than 0.1%.

The following combinations were tested using the above test for three and four component compositions. The examples demonstrate certain unexpected advantages obtained with these compositions.

EXAMPLE 1

(1) Four and five component compositions, PPE, PE Copolymers, Modified SEBS, and RF Active Polymer.

| Comp. | Autoclav | Haze (%) | E (Kpsi) | RF | S. Whitening | L. Temp | Envir. | S. Comp. |
|---|---|---|---|---|---|---|---|---|
| A | Yes | 20 | 45 | 4 | 0 | −30 | Yes | Yes |
| B | Yes | 20 | 35 | 4 | 0 | −40 | Yes | Yes |
| C | Yes | 20 | 35 | 4 | 0 | −25 | Yes | Yes |
| D | Yes | 25 | 35 | 4 | 0 | −25 | Yes | Yes |
| E | Yes | 15 | 25 | 4 | 0 | −40 | Yes | Yes |
| F | Yes | 15 | 25 | 4 | 0 | −40 | Yes | Yes |
| G | Yes | 15 | 25 | 4 | 0 | −40 | Yes | Yes |
| H | Yes | 20 | 25 | 3 | 0 | −40 | Yes | Yes |
| I | Yes | 25 | 22 | 3 | 0 | −40 | Yes | Yes |

A. 60% Soltex 4202, 20% Mitsui Tafmer A-4085, 15% Kraton RP6509, 5% PA-12.
B. 50% Soltex 4208, 30% Tafmer A-4085. 15% Kraton G1657, 5% PA-12.
C. 50% Soltex 4208, 30% Chevron EMAC DS1130, 10% Kraton RP6509, 10% Henkel MM-6301.
D. 50% Soltex 4208, 30% EMAC-DS1130, 10% Kraton RP6509, 5% PEU-103-200, 5% MM-6301.
E. 45% Soltex 4208, 35% Tafmer A-4085, 10% Kraton RP6509, 10% Henkel MM-6239.
F. 45% Soltex 4208, 35% Exxon EXACT4028, 10% Kraton RP6509, 10% MM-6301.
G. 45% Soltex 4208, 35% Exact-4024, 10% Kraton RP6509, 10% MM-6301.
H. 45% Soltex 4208, 35% Exact-4023, 10% Kraton RP6509, 10% MM-6301.
I. 40% Soltex 4208, 40% Tafmer A-4085, 10% Kraton RP6509, 10% Poly Vinyl Acetate (40% Hydrolyzed MW = 72,000).

EXAMPLE 2

(2) Four Component Compositions: PPE, Polybutene-1 (copolymers), Modified SEBS, and Polyamide alloys.

| Comp. | Autoclav | Haze (%) | E (Kpsi) | RF | S. Whitening | L. Temp | Envir. | S. Comp. |
|---|---|---|---|---|---|---|---|---|
| A | Yes | 15 | 40 | 4 | 0 | −20 | Yes | Yes |
| B | yes | 20 | 40 | 4 | 0 | −20 | Yes | Yes |
| C | Yes | 20 | 30 | 4 | 0 | −20 | Yes | Yes |
| D | Yes | 20 | 30 | 4 | 0 | −20 | Yes | Yes |
| E | Yes | 15 | 30 | 4 | 1 | −20 | Yes | Yes |

-continued

| Comp. | Autoclav | Haze (%) | E (Kpsi) | RF | S. Whitening | L. Temp | Envir. | S. Comp. |
|---|---|---|---|---|---|---|---|---|
| F | Yes | 15 | 30 | 4 | 1 | −20 | Yes | Yes |
| G | Yes | 20 | 30 | 4 | 1 | −20 | Yes | Yes |

A. 55% Soltex 4208, 35% Shell PB8010, 10% 5% Kraton RP6509, 5% L-20.
B. 55% Soltex 4208, 25% PB-8310, 10% Kraton RP6509, 10% Henkel MM-6301.
C. 45% Soltex 4208, 35% PB-8310, 10% Kraton RP6509, 10% MM-6239.
D. 45% Exxon Escorene PD9272, 35% PB-8010, 10% Kraton RP6509, 10% MM-6301.
E. 45% Soltex 4208, 35% PB-8010, 10% Kraton RP6509, 10% MM-6301.
F. 45% Soltex 4208, 35% PB-8010, 10% Kraton RP6509, 10% Uni-Rez2633.
G. 45% Soltex 4208, 35% PB-8310, 10% Kraton RP6509, 10% MM-6301.

EXAMPLE 3

(3) Four Component Compositions: PPE, Polyisobutene, Modified SEBS, and Polyamide alloys.

| Comp. | Autoclav | Haze (%) | E (Kpsi) | RF | S. Whitening | L. Temp | Envir. | S. Comp. |
|---|---|---|---|---|---|---|---|---|
| A | Yes | 35 | 40 | 3 | 1 | −30 | Yes | Yes |
| B | Yes | >50 | 30 | 3 | 1 | −30 | Yes | Yes |
| C | Yes | 35 | 30 | 4 | 1 | −25 | Yes | Yes |
| D | Yes | 40 | 30 | 4 | 1 | −25 | Yes | Yes |
| E | Yes | >40 | 30 | 4 | 1 | −25 | Yes | Yes |
| F | Yes | >40 | 30 | 4 | 1 | −25 | Yes | Yes |

A. 50% Soltex 4208, 30% Exxon Vistanex L120, 5% Kraton RP6509, 10% Kraton G-1657, 5% PA-12.
B. 35% Soltex 4208, 45% Vistanex L120, 15% Kraton RP6509, 5% PA-12.
C. 45% Soltex 4208, 35% Vistanex L-80, 10% Kraton RP6509, 10% Henkel MM-6301.
D. 45% Soltex 4208, 35% Vistanex L-100, 10% Kraton RP6509, 10% Hendel MM-6301.
E. 45% Soltex 4208, 35% Vistanex L120, 10% Kraton RP6509, 10% Henkel MM-6301.
F. 45% Soltex 4208, 35% Vistanex L-140, 10% Kraton RP6509, 10% Henkel MM-6301.

EXAMPLE 4

(4) Four and five Component Compositions: PPE, EMA, Modified SEBS, 4th and 5th component alloys.

| Comp. | Autoclav | Haze (%) | E (Kpsi) | RF | S. Whitening | L. Temp | Envir. | S. Comp. |
|---|---|---|---|---|---|---|---|---|
| A | Yes | 25 | 25 | 3 | 1 | −25 | Yes | Yes |
| B | Yes | 25 | 20 | 4 | 0 | −25 | Yes | Yes |
| C | Yes | 20 | 25 | 4 | 0 | −25 | Yes | Yes |
| D | Yes | 25 | 25 | 4 | 0 | −25 | Yes | Yes |

A. 35% Soltex 4208, 45% EMAC2207, 10% Kraton RP6509, 10% Eastman PCCE9966.
B. 30% Soltex 4208, 40% EMAC DS-1130, 10% Kraton RP6509, 15% PEU103-200, 5% Eastman Ecdel 9966
C. 35% Soltex 4208, 40% EMAC DS1130, 5% Kraton RP6509, 10% PEU103-200, 10% Kraton G1652.
D. 35% Soltex 4208, 40% DS1130, 10% Kraton RP6509, 5% PEU103-200, 10% Kraton G1652.

EXAMPLE 5

(5) Four Component Compositions: PPE, EMA, modified SEBS, RF activity Enhancer Alloys. (more than 150 formulations).

| Comp. | Autoclav | Haze (%) | E (Kpsi) | RF | S. Whitening | L. Temp | Envir. | S. Comp. |
|---|---|---|---|---|---|---|---|---|
| A | Yes | 20 | 30 | 3 | 1 | −20 | Yes | Yes |
| B | Yes | 20 | 25 | 3 | 0 | −25 | Yes | Yes |
| C | Yes | 20 | 20 | 4 | 0 | −30 | Yes | Yes |
| D | Yes | 20 | 20 | 4 | 0 | −30 | Yes | Yes |
| E | Yes | 25 | 30 | 4 | 1 | −25 | Yes | Yes |

-continued

| Comp. | Autoclav | Haze (%) | E (Kpsi) | RF | S. Whitening | L. Temp | Envir. | S. Comp. |
|---|---|---|---|---|---|---|---|---|
| F | Yes | 20 | 25 | 4 | 0 | −30 | Yes | Yes |
| G | Yes | >40 | 25 | 2 | 1 | −20 | Yes | Yes |

A. 45% Fina 7825, 45% Chevron EMA (42% MA), 10% Morton PEU 192-100.
B. 40% Soltex 4208, 40% Chevron EMAC2260, 10% Shell Kraton RP6509, 10% PEU192-100.
C. 35% Soltex 4208, 45% EMAC2260, 10% Shell Kraton RP6509, 10% PEU192-100.
D. 35% Soltex 4208, 45% EMAC2260, 10% Kraton G-1657, 10% PEU103-200.
E. 40% Soltex 4208, 40% EMAC2220T, 10% Kraton RP6509, 10% PEU103-200.
F. 35% Soltex 4208, 40% EMAC DS1130, 10% Kraton RP6509, 15% PEU103-200.
G. 35% Mitsuit MA modified PP AdmerSF700, 40% EMAC DS1130, 10% Kraton RP6509, 15% PEU103-200.

EXAMPLE 6

(6) Four Component Compositions: PPE, ENBA, Modified SEBS alloys.

| Comp. | Autoclav | Haze (%) | E (Kpsi) | RF | S. Whitening | L. Temp | Envir. | S. Comp. |
|---|---|---|---|---|---|---|---|---|
| A | Yes | 25 | 30 | 2 | 0 | −20 | Yes | Yes |
| B | Yes | 25 | 30 | 2 | 0 | −20 | Yes | Yes |

A. 40% Soltex 4208, 40% Quantum ENBA80807 (35% BA), 10% Kraton RP6509, 10% PEU103-200.
B. 40% Soltex 4208, 40% ENBA80808 (35% BA), 10% Kraton RP6509, 10% PEU103-200.

EXAMPLE 7

(7) Three and Four Component Compositions: PPE, Ethylene Vinyl Alcohol, polyamide, and Modified SEBS Alloys.

| Comp. | Autoclav | Haze (%) | E (Kpsi) | RF | S. Whitening | L. Temp | Envir. | S. Comp. |
|---|---|---|---|---|---|---|---|---|
| A | Yes | 35 | 45 | 4 | 1 | −30 | Yes | Yes |
| B | Yes | 25 | 40 | 2 | 1 | −30 | Yes | Yes |
| C | Yes | 25 | 35 | 4 | 1 | −30 | Yes | Yes |
| D | Yes | 35 | 60 | 4 | 1 | −25 | Yes | Yes |
| E | Yes | 30 | 35 | 4 | 0 | −30 | Yes | Yes |
| F | Yes | 25 | 45 | 4 | 0 | −30 | Yes | Yes |
| G | Yes | 25 | 45 | 4 | 0 | −30 | Yes | Yes |

A. 55% Soltex 4208, 5% EVALCA LCE151A, 40% Shell Kraton RP6509.
B. 55% Soltex 4208, 5% EVALCA ES-G110A, 5% Shell Kraton RP6509, 35% Shell Kraton 1652.
C. 50% Soltex 4208, 5% EVALCA LCE105A, 42% Shell Kraton RP6509, 3% PA-12.
D. 72% Soltex 4208, 18% Kraton RP6509, 10% EVALCA G-115A.
E. 55% Soltex 4208, 10% PA-12, 35% Kraton G1901X.
F. 60% Soltex 4208, 5% PA-12, 35% Kraton RP6509.
G. 60% Soltex 4208, 5% Versalon 1164, 35% Kraton RP6509.

EXAMPLE 8

(8) Three and four Component Compositions: PPE, EVA, Amide based TPE, EMAA compositions (Flexible component and RF component are the same).

| Comp. | Autoclav | Haze (%) | E (Kpsi) | RF | S. Whitening | L. Temp | Envir. | S. Comp. |
|---|---|---|---|---|---|---|---|---|
| A | Yes | 20% | 20 | 4 | 0 | −20C | Yes | Yes |
| B | Yes | 30% | 20 | 4 | 0 | −25C | Yes | Yes |
| C | Yes | 20 | 25 | 3 | 0 | −25 | Yes | Yes |
| D | Yes | 25 | 25 | 3 | 0 | −25 | Yes | Yes |
| E | Yes | 20 | 20 | 4 | 0 | −30C | Yes | Yes |
| F | Yes | 30 | 30 | 4 | 0 | −20 | Yes | Yes |
| G | Yes | >50% | ca. 60 | 3 | 1 | −20 | Yes | No |
| H | Yes | >50% | ca. 50 | 4 | 1 | −25 | Yes | No |

-continued

| Comp. | Autoclav | Haze (%) | E (Kpsi) | RF | S. Whitening | L. Temp | Envir. | S. Comp. |
|---|---|---|---|---|---|---|---|---|
| I | Yes | >50% | ca. 55 | 4 | 1 | −20 | Yes | No |
| J | Yes | >50% | 45 | 3 | 1 | −25 | Yes | No |
| K | Yes | >50% | 40 | 4 | 1 | −30 | Yes | No |
| L | Yes | 25 | 25 | 3 | 0 | −30 | Yes | Yes |
| M | Yes | 20 | 25 | 4 | 1 | −25 | Yes | Yes |
| O | Yes | 20 | 25 | 3 | 1 | −30 | Yes | Yes |
| P | Yes | 20 | 25 | 3 | 1 | −30 | Yes | Yes |
| Q | Yes | 20 | 25 | 3 | 1 | −30 | Yes | Yes |
| R | Yes | 20 | 25 | 3 | 1 | −30 | Yes | Yes |

A. 35% Fina 7825, 55% Dupont Elvax 170 (36% VA), 10% Shell Kraton RP6509.
B. 35% Soltex 4208, 55% Elvax 170, 10% Kraton RP6509.
C. 40% Soltex 4208, 50% Quantum UE659, 10% Kraton RP6509.
D. 40% Soltex 4208, 50% UE634, 10% Kraton RP6509.
E. 35% Soltex 4208, 40% UE659, 10% Kraton RP6509, 10% Morton PEU 192-100.
F. (more than 100 formulations), Fina, Soltex, BASF, REXENE PP's (45%), 45% Quantum UE644-04, 10% Kraton RP6509.
G. 50% PEBAX 4033, 35% Fina Z-7650, 15% Shell Kraton G1901X.
H. 50% PEBAX 4033, 20% Fina 8473, 20% K-1901X, 10% EVA (28% VA).
I. 50% PEBAX 2533, 25% Fina 8473, 15% K-1901X, 10% EVA (28% VA).
J. 60% PEBAX 4033, 20% EVA (28% VA), 20% Shell Kraton G-1652.
K. 60% PEBAX 4033, 20% PEBAX 2533, 20% EVA (28% VA).
L. 30% Fina 7825, 60% Morton PEU 103-200, 10% Shell Kraton RP6509.
M. 35% Soltex 4208, 55 Chevron DS1009, 10% Shell Kraton RP6509.
O. 45% Soltex 4208, 45% Dupont Nucrel (EMAA) 925, 10% Shell Kraton RP6509.
P. 45% Soltex 4208, 45% Dupont Nucrel −0.35, 10% Kraton RP-6509.
Q. 45% Soltex 4208, 45% Dupont Evaloy EP4051 (ENBACO), 10% Kraton RP-6509.

EXAMPLE 9

(9) Three Component Compositions: PPE, EVA, Amide based TPE alloys (flexible and High Temperature Resistance Components the Same).

| Comp. | Autoclav | Haze (%) | E (Kpsi) | RF | S. Whitening | L. Temp | Envir. | S. Comp. |
|---|---|---|---|---|---|---|---|---|
| C | Yes | 25 | 30 | 3 | 0 | −20 | Yes | Yes |
| D | Yes | 35 | 30 | 2 | 0 | −20 | Yes | Yes |

C. 45% REXENE FPO 90007, 45% Elvax 170, 10% Kraton RP6509.
D. 60% FPO 90007, 30% EMAC (42% MA), 10% Shell Kraton RP6509.

EXAMPLE 10

(10) Tafmer, homo, high amorphous content PP, and PP random copolymer compositions.

| Comp. | Autoclav | Haze (%) | E (Kpsi) | RF | S. Whitening | L. Temp | Envir. | S. Comp. |
|---|---|---|---|---|---|---|---|---|
| A | No | ca. 25 | 22 | 0 | 0 | −30 | Yes | Yes |
| B | Yes | ca. 20 | 31 | 0 | 0 | −30 | Yes | Yes |
| C | No | ca. 23 | 25 | 0 | 0 | −30 | Yes | Yes |

A. 60% Tafmer A-4085, 40% Novolene 1300L.
B. 50% Tafmer A-4085, 10% Dypro 8473, 40% Novolene 1300L.
C. 50% Tafmer A-4085, 20% Dypro 8473, 30% Novolene 1300L.

Novolene is a high Amorphous content homo polypropylene by BASF, Dypro8473 is a random copolymer of propylene and ethylene of about 3.5% ethylene content by Cosden (Fina).

EXAMPLE 11

(11) Tafmer, PP and Polybutene-1 alloys.

| Comp. | Autoclav | Haze (%) | E (Kpsi) | RF | S. Whitening | L. Temp | Envir. | S. Comp. |
|---|---|---|---|---|---|---|---|---|
| A | Yes | ca. 25 | 17 | 0 | 0 | −30 | Yes | Yes |
| B | Yes | ca. 30 | 35 | 0 | 0 | −30 | Yes | Yes |
| C | Yes | ca. 30 | 15 | 0 | 0 | −30 | Yes | Yes |

A. 30% Tafmer A-4085, 30% PB-8010, 40% Novolene 1300L.
B. 50% Rexene 23M2, 25% PB-8010, 25% Tafmer A-4085.
C. 40% Rexene 23M2, 30% PB-8010, 30% Tafmer A-4085.

Rexene 23M2 is a random Polypropylene ethylene copolymer of about 2% ethylene content. PB-8010 is a poly-butene ethylene copolymer by Shell Chemical.

We claim:

1. A polymeric composition comprising:
   a heat distortion resistant polypropylene;
   a radio frequency susceptible polymer having a dielectric loss greater than 0.05 at 1–60 MHz and ambient temperature to 250° C. the radio frequency polymer being a polyamide;
   a styrenic block copolymer with hydrocarbon soft segments;
   a flexibilizing polymer capable of imparting flexibility to the polymeric composition, wherein the flexibilizing polymer is selected from the group consisting of ultra low density polyethylene, polybutene, and butene ethylene copolymers;
   wherein the flexibilizing polymer and the heat distortion resistant polymer together comprise approximately 55% or more by weight of the polymeric composition; and
   the composition having physical properties as follows:
   a<40,000 psi;
   b>=70%;
   c<30%;
   d>1.0;
   e<0.1%;
   f<0.1%;
   g>=0.05
   h<=60%;
   wherein:
   a is the mechanical modulus of the composition measured according to ASTM D-882;
   b is the percent recovery in length of the composition after an initial 20% deformation;
   c is the optical haze of the composition processed into a film 9 mils in thickness measured according to ASTM D-1003;
   d is the loss tangent of the composition at 1 Hz measured at melt processing temperatures;
   e is the elemental halogen content by weight of the composition;
   f is the weight fraction of components capable of leaching from the composition into an aqueous phase;
   g is the dielectric loss between 1 and 60 MHz and over temperatures of 25° to 250° C. of the composition;
   h is the sample creep measured at 121° C. for a 1 inch strip of the composition under 27 psi loading; and wherein,
   the composition exhibits no strain whitening after being strained at moderate speeds of about 20 inches (50 cm) per minute to about 100% elongation.

2. The composition of claim 1 wherein the flexibilizing polymer is an ultra low density polyethylene.

3. The composition of claim 1 wherein the flexibilizing polymer is polybutene-1.

4. A polymer based composition for fabricating into articles comprising:
   a first polyolefin selected from the group consisting of polypropylene and propylene copolymers;
   a second polyolefin selected from the group consisting of polyethylene, ethylene copolymers, polybutene-1, and butene-1 copolymers, the first and second polyolefin together comprise approximately 55% or more by weight of the polymeric composition;
   a radio frequency susceptible polymer having a dielectric loss greater than 0.05 at 1–60 MHz and ambient temperature to 250° C., the radio frequency polymer being a polyamide;
   a styrenic block copolymer with hydrocarbon soft segments; and
   the composition having a mechanical modulus of less than 40,000 psi measured according to ASTM D-882.

5. The composition of claim 4 wherein the second polyolefin is an ultra low density polyethylene.

6. The composition of claim 4 wherein the second polyolefin is a polybutene-1.

7. The composition of claim 4 wherein the styrenic block copolymer is a styrene ethylene-butene-styrene ("SEBS") block copolymer.

8. The composition of claim 7 wherein the SEBS block copolymer is maleic anhydride functionalized.

9. The composition of claim 7 wherein the radio frequency susceptible polymer is selected from a group consisting of: aliphatic polyamides resulting from a condensation reaction of di-amines having a carbon number within the range of 2–13, aliphatic polyamides resulting from a condensation reaction of di-acids having a carbon number within a range of 2–13, polyamides resulting from the condensation reaction of dimer fatty acids, and amide containing copolymers.

10. The composition of claim 9 wherein the first polyolefin is in an amount in the range of 30–60% by weight of the composition.

11. The composition of claim 9 wherein the second polyolefin is in an amount in the range of 25–50% by weight of the composition.

12. The composition of claim 11 wherein the radio frequency susceptible polymer is in an amount within the range of 3–40% by weight of the composition.

13. The composition of claim 12 wherein the styrenic block copolymer is within the range of 5–40% by weight of the composition.

14. The composition of claim 4 wherein the radio frequency susceptible polymer is a dimer fatty acid polyamide.

15. A polymer based composition for fabricating into articles comprising:

a polypropylene in an amount within the range of 30–60% by weight of the composition;

a polyolefin in an amount within the range of 25–50% by weight of the composition, the polyolefin is selected from the group consisting of ultra low density polyethylene, polybutene, and butene ethylene copolymers;

a dimer fatty acid polyamide in an amount within the range of 5–40% by weight of the composition;

a styrene-ethylene-butene-styrene block copolymer in an amount within the range of 5–40% by weight of the composition; and, the polymer composition having a mechanical modulus of less than 40,000 psi when measured according to ASTM D-882.

16. The composition of claim 15 wherein the polyolefin is an ultra low density polyethylene.

17. The composition of claim 16 wherein the polyolefin is polybutene-1.

18. The composition of claim 15 wherein the styrene-ethylene-butene-styrene block copolymer is maleic anhydride functionalized.

* * * * *

UNITED STATES PATENT AND TRADEMARK OFFICE
CERTIFICATE OF CORRECTION

PATENT NO. : 5,849,843
DATED : Dec. 15, 1998
INVENTOR(S) : Laurin et al.

It is certified that errors appear in the above-identified patent and that said Letters Patent is hereby corrected as shown below:

In Column 10, under Example 1, in letter A under the table replace "4202" by ----4208--.

In Column 15, Example 8, below letter Q beneath the table, insert --R. 45% Soltex 4208, 45% Quantum UE648 (18% VA), 10% Kraton RP-6509.

In Column 18, line 39, Claim 7, replace "styrene ethylene-butene-styrene" by --styrene-ethylene-butene-styrene--.

Signed and Sealed this

Twenty-second Day of February, 2000

Attest:

Q. TODD DICKINSON

*Attesting Officer*  *Commissioner of Patents and Trademarks*